United States Patent [19]
Shimose et al.

[11] Patent Number: 5,732,290
[45] Date of Patent: Mar. 24, 1998

[54] MAGNIFICATION AND FOCUS ADJUSTMENT CONTROL DEVICE

[75] Inventors: Takashi Shimose; Yuichi Honda, both of Hachioji, Japan

[73] Assignee: Konica Corporation, Tokyo, Japan

[21] Appl. No.: 724,477

[22] Filed: Oct. 1, 1996

[30] Foreign Application Priority Data

Oct. 6, 1995 [JP] Japan ................................. 7-260240
Dec. 21, 1995 [JP] Japan ................................. 7-333381

[51] Int. Cl.⁶ .......................... G03B 5/00; G03B 13/34
[52] U.S. Cl. .................... 396/83; 396/90; 359/698
[58] Field of Search ............................ 396/79, 80, 83, 396/90, 81, 82; 359/696, 697, 698

[56] References Cited

U.S. PATENT DOCUMENTS 4,763,999   8/1988   Lawther .............................. 396/82
4,885,600  12/1989   Iwasa et al. ........................ 396/81
5,196,963   3/1993   Sato et al. ....................... 396/79 X
5,223,873   6/1993   Tsuboi ............................... 396/82
5,267,085  11/1993   Sasaki et al. ................. 359/697 X

*Primary Examiner*—W. B. Perkey
*Attorney, Agent, or Firm*—Finnegan, Henderson, Farabow, Garrett & Dunner, L.L.P.

[57] ABSTRACT

A magnification and focus adjustment control device, includes a first lens unit; a second lens unit; and a first and second guiding device for guiding a movement of the second lens unit. While an operation of a magnification change is conducted, a position of the second guiding device relating to the first guiding device is selected to be a lens guiding position where the second lens unit is guided by the first and second guiding devices so that the second lens unit moves along a predetermined locus relating to a movement of the first lens unit. While an operation of a focus adjustment is conducted, the position of the second guiding device relating to the first guiding device is selected to be a guide releasing position where a guidance of the predetermined locus of the second guiding device relating to the first guiding device is released.

13 Claims, 16 Drawing Sheets

FIG. 15 (a)
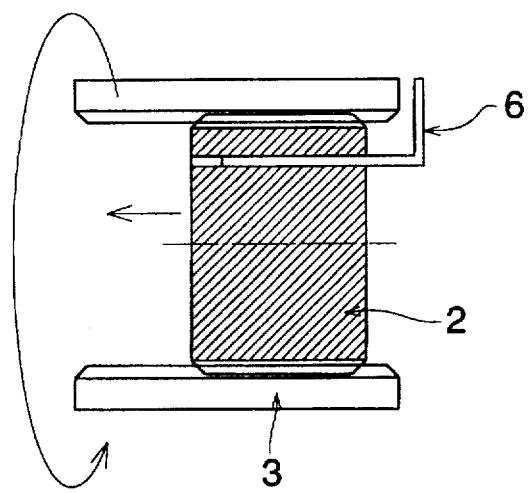
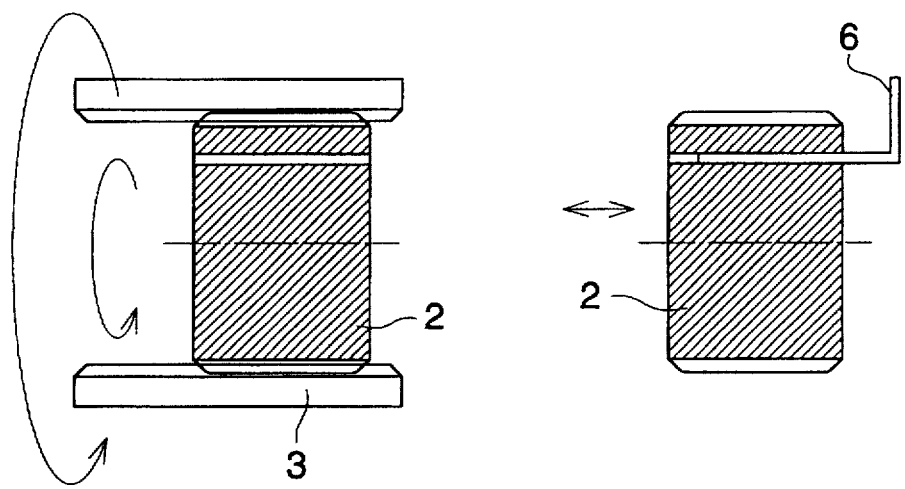
FIG. 15 (b)   FIG. 15 (c)

MAGNIFICATION AND FOCUS ADJUSTMENT CONTROL DEVICE

BACKGROUND OF THE INVENTION

The present invention relates to a magnification and focus adjustment control device used for a still camera, a video camera, and similar devices.

Generally, as a conventional magnification and focus adjustment control device as described above, a focusing actuator and a shutter driving actuator are held in a moving lens group, and further, a zooming motor for magnification changing motion is provided in the moving lens group. However, in such a magnification and focus adjustment control device, 3 driving members are required, and thereby, there is a drawback in which cost is greatly increased when including control members for all three driving members.

Therefore, a magnification and focus adjustment control device in which the focusing actuator is eliminated, and both the magnification changing motion and the focusing motion are conducted by only a zooming motor, is considered. For example, in Japanese Patented Publication No. 100707/1994, an invention in which a plurality of lens group, constituting a zoom lens, is driven stepwise so that the magnification changing motion and the focusing motion are carried out by a single driving mechanism, is disclosed. However, in the magnification and focus adjustment control device of the invention, the magnification change from the telephoto-end to the wide angle-end is divided into distinct steps, and thereby, an original purpose of the zoom lens, in which a photographic magnification can be arbitrarily and freely selected from the telephoto-end to the wide angle-end, is not satisfied. Accordingly, the magnification and focus adjustment control device of the invention should rather be called a multi-focus optical system.

In a camera in which a multi-step driving type zoom lens is incorporated, in many cases, the driving force for the zoom view finder lens is obtained from the rotational motion of the cam barrel which is a rotating body for a zoom lens barrel, which is a driving body for the photographic lens, or from a movement motion of the cam barrel along the optical axis. In such cases, a cam barrel, which is a rotational body, is rotated and moved along the optical axis even during focusing, and a magnification of the view finder is changed, which is a disadvantage.

SUMMARY OF THE INVENTION

The present invention is accomplished in view of the foregoing problems. An object of the present invention is to provide a magnification and focus adjustment control device for a zoom lens barrel in which both the magnification changing operation and the focus adjustment operation of a zoom lens are carried out by a single driving mechanism; an arbitrary zooming magnification can be selected from the telephoto-end to the wide angle-end by a smooth stepless operation, rather than by a stepwise operation; and a view finder magnification is not changed during the focusing operation.

The object of the present invention can be accomplished by one of the following structures.

The above object can be attained by the following first structure.

A magnification and focus adjustment control device comprising the first lens unit, the second lens unit, and the first guiding means and the second guiding means for guiding the movement of the second lens unit, the magnification and focus adjustment control device characterized in that: while magnification is changing, a position of the second guiding means relating to the first guiding means is selected so as to be a lens guiding position where the second lens unit is guided by the first guiding means and the second guiding means so that the second lens unit is moved along a predetermined locus with respect to the movement of the first lens unit during changes of magnification; and while the focus is adjusted, the position of the second guiding means relating to the first guiding means is selected so as to be a position where guidance along the predetermined locus for the second lens unit by the first guiding means and the second guiding means, is released.

More specifically, a magnification and focus adjustment control device of the present invention is characterized as follows. A magnification and focus adjustment control device comprises the first lens unit, the second lens unit, the first lens unit guiding means to guide the first lens unit so as to be moved along a predetermined locus by a driving force from a driving source, and the fist guiding means and the second guiding means to guide the movement of the second lens unit. While magnification is changed, a position of the second guiding means relating to the first guiding means is selected so as to be a lens guiding position where the second lens unit is guided by the first guiding means and the second guiding means so that the second lens unit is moved along the predetermined locus with respect to the first lens unit which is moved by guidance of the first lens unit guiding means by the driving force from the driving source, and the second lens unit is moved along a predetermined locus, being guided by the first guiding means and the second guiding means by the driving force of the driving source. While focus is adjusted, a position of the second guiding means relating to the first guiding means is selected so as to be a position where a guidance along the predetermined locus for the second lens unit by the first guiding means and the second guiding means is released, so that guidance for the second lens unit by the first guiding means and the second guiding means is not conducted, with respect to the first lens unit which is moved being guided by the first lens guiding means by the driving force from the driving source.

As shown in FIG. 14, in a lens system in which positions along the optical axis of 2 lenses of a front-side lens 1 and a rear-side lens 2 are changed, and thereby, magnification adjustment (zooming) is carried out, a locus along which lenses move in order to focus the object at a certain arbitrary distance, is predetermined, and thereby, the mutual distance between 2 lenses becomes a predetermined value for each zooming position. This is expressed by the expression "a prescribed relation" in the present application. In this connection, loci, along which both lenses can move, in the present application, mean zooming loci along which both lenses can continuously move at an arbitrary focal length, and do not mean a locus of a multiple-focus type pseudo-zoom lens in which the zooming motion is divided into several steps.

As shown in FIGS. 15(a), 15(b) and 15(c), a mechanism which moves a certain body (herein, a lens unit), forward and backward along the optical axis without rotating the body, needs, at least, 2 parts of a mechanical body (the second guiding means 3) having a zoom sliding groove such as a cam or a helicoid, and a linear movement regulating means (the third guiding means 6), as shown in FIG. 15(b), which are essential components. When one of the guiding means is released, a predetermined locus movement control of the lens unit becomes impossible. As shown in FIG. 15(b), in the case where the third guiding means 6 is released, the lens unit and the second guiding means 3 are integrally rotated when the lens unit and the third guiding means 3 are fixed to each other by frictional force, or the like. As shown in FIG. 15(c), when the second guiding means 3 is released, the lens unit is not rotated, but moves freely along the optical axis. In either case, the lens unit deviates from a predetermined locus for change of magnification, and thereby, if a position in the direction of the optical axis of the lens unit in such a case can be controlled, the focus adjustment control (focusing) can be conducted.

That is, in a magnification and focus adjustment control device of the present invention, both the magnification changing operation and the focus adjustment operation of a zoom lens are conducted by a single driving mechanism, by which the first lens unit is moved, and arbitrary zooming magnification can be selected from the telephoto-end to the wide angle-end in the magnification changing operation.

The second structure of the present invention is as follows.

A magnification and focus adjustment control device comprising the first lens unit, the second lens unit, the first guiding means to guide the movement of the first lens unit, and the second guiding means to guide the movement of the second lens unit, the magnification and focus adjustment control device characterized in that, while magnification is changed, the movement of the first and the second lens units is guided under the condition that the interval between the first and the second guiding means along the optical axis is constant; and while the focus is adjusted, the movement of the first and the second lens units is guided while the interval between the first and the second guiding means along the optical axis is being changed.

As shown in FIGS. 16(a), 16(b) and 16(c), in the case where the first guiding means 106 having a zoom sliding groove for guiding the movement of the first lens unit 101, and the second guiding means 105 having a zoom sliding groove for guiding the movement of the second lens unit 102 are structured as separated parts, when the relative position of these 2 guiding means is changed, a mutual distance between 2 lens units is changed. When this change of the mutual distance is controlled, the focus adjustment control can be performed.

As shown in FIG. 17, the optical axis is an axis which passes through the center of the lens system and is perpendicular to the image forming surface (the film surface). "The relative position in direction of the optical axis is changed" means that 2 parts (the first guiding means 105 and the second guiding means 106) are moved forward or backward, and position of the 2 parts is respectively changed to each other.

BRIEF DESCRIPTION OF THE DRAWINGS

FIGS. 15(a), 15(b) and 15(c) are views showing mechanisms which move the lens unit forward and backward along the optical axis.

DETAILED DESCRIPTION OF THE PREFERRED EMBODIMENT

Referring to the attached drawings, the present invention will be described below.

Figure 1:
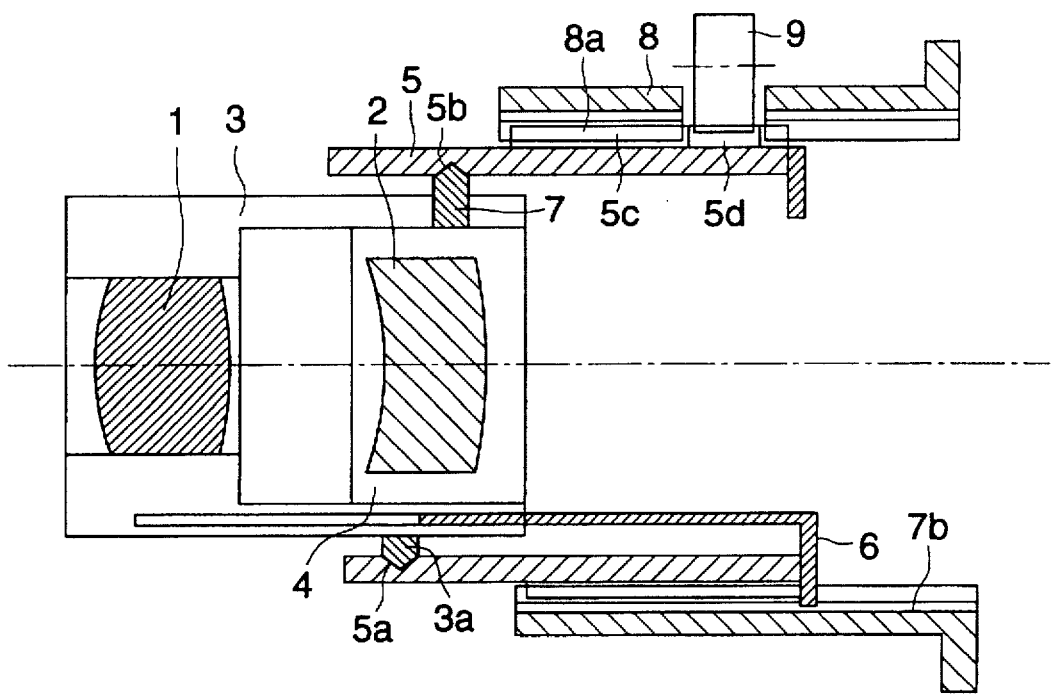
FIG. 1 is a sectional view including an optical axis, showing an example of a magnification and focus adjustment control device of the present invention.
Figure 2:
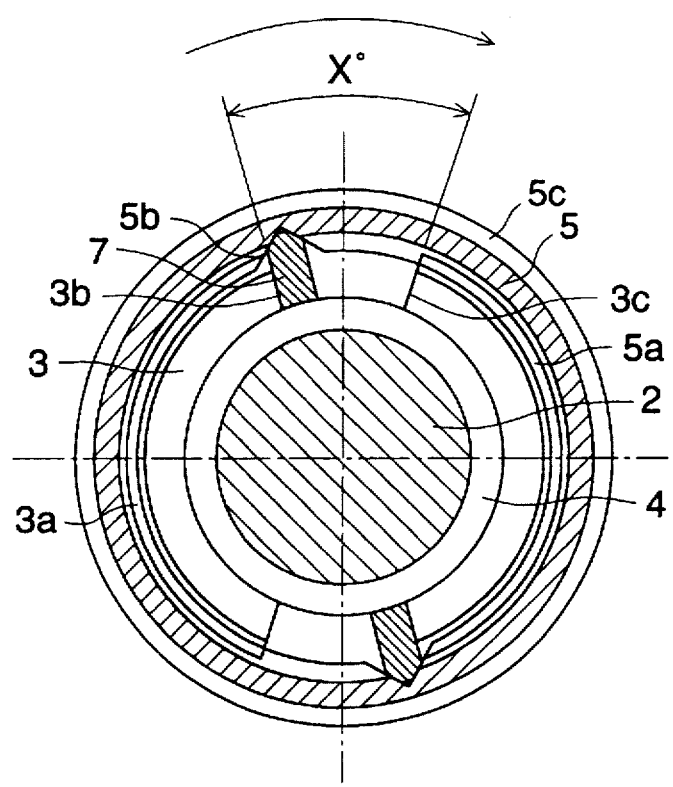
FIG. 2 is a partial sectional view perpendicular to the optical axis, showing a rotated condition of the second lens unit, viewed from the rear surface-side of the lens barrel.
Figure 3:
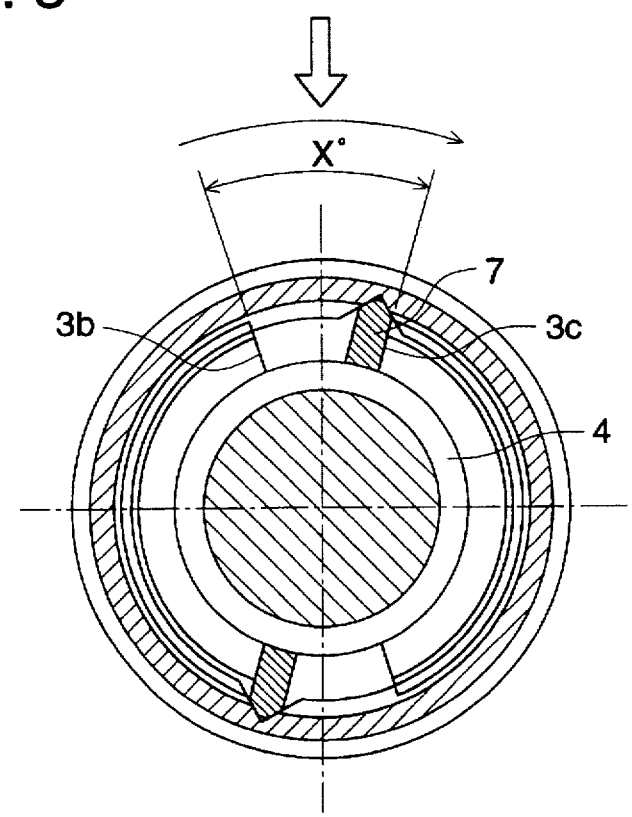
FIG. 3 is a partial sectional view perpendicular to the optical axis, showing a rotated condition of the second lens unit, viewed from the rear surface-side of the lens barrel.
Figure 4:
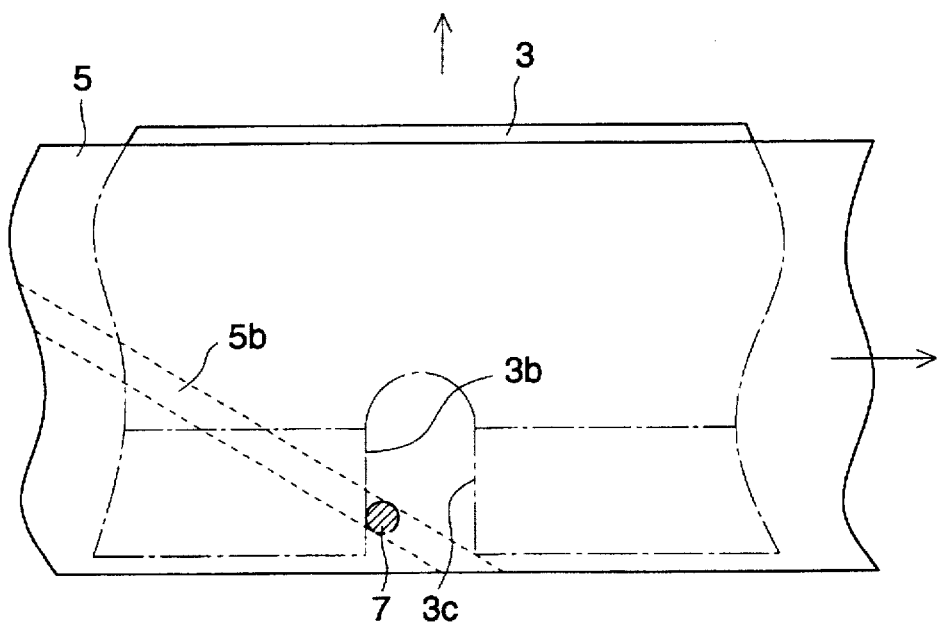
FIG. 4 is a developed plan view showing the relationship of the rotational position of the first and second lens unit driving member and positions of the first and second lens units in the direction of the optical axis, viewed from the direction of a white arrow in FIG. 3.
Figure 5:
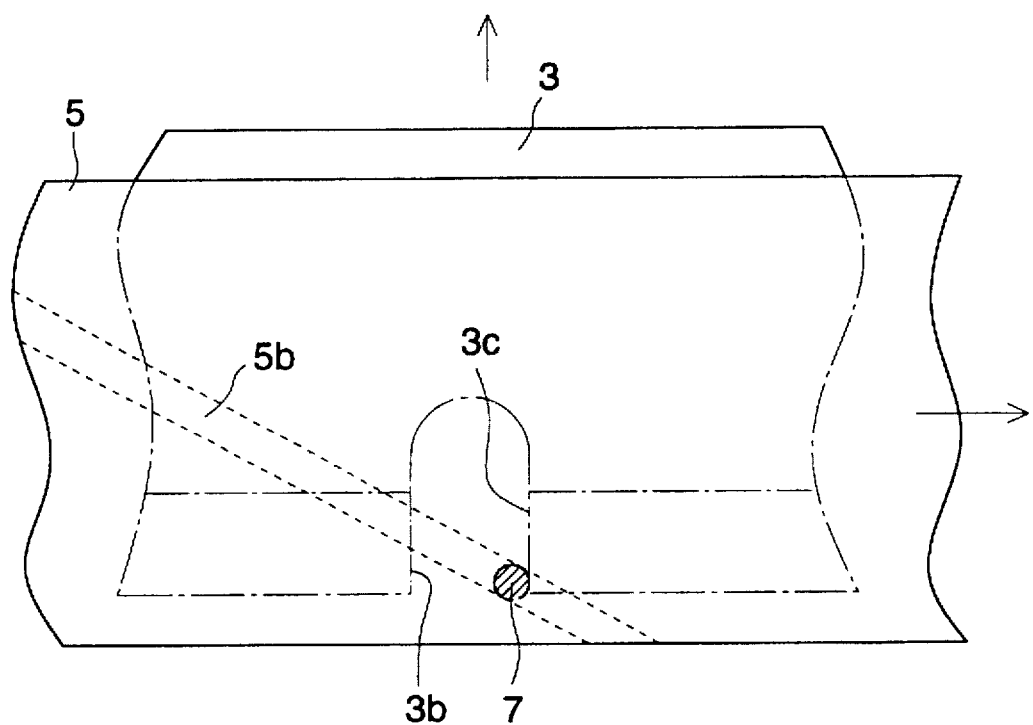
FIG. 5 is a developed plan view showing the relationship of the rotational position of the first and second lens unit driving member and positions of the first and second lens units in the direction of the optical axis, viewed from the direction of the white arrow in FIG. 3.
Figure 6:
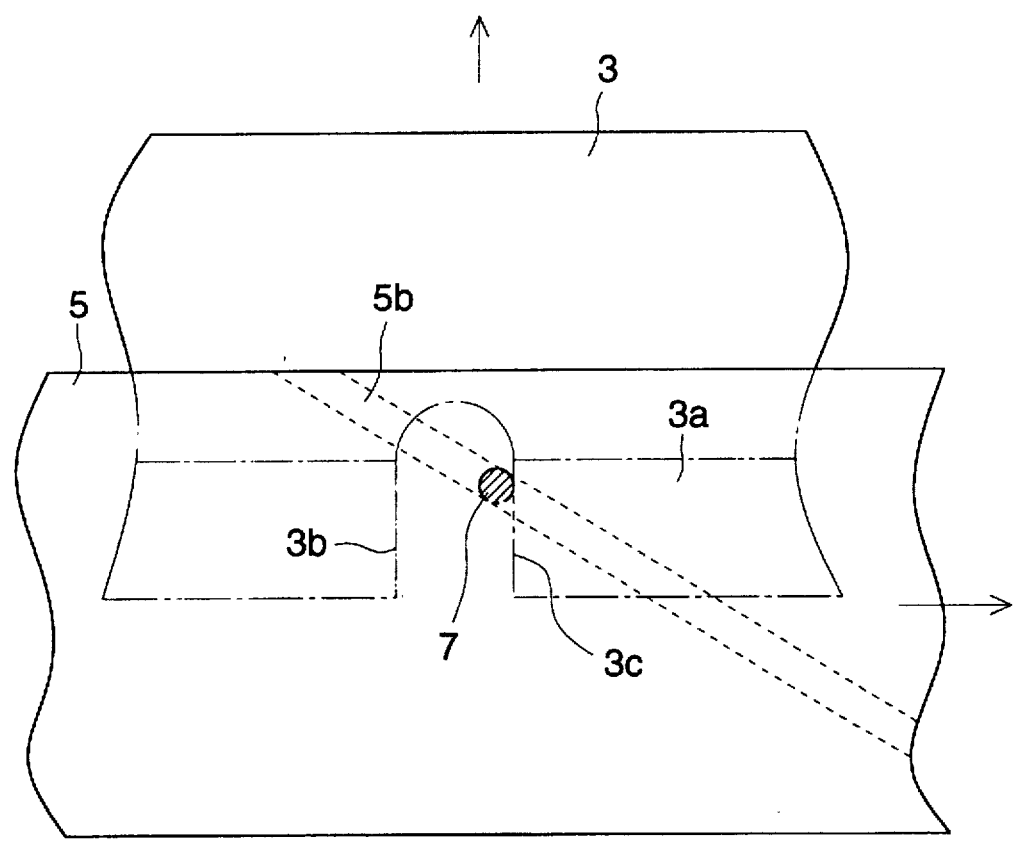
FIG. 6 is a developed plan view showing the relationship of the rotational position of the first and second lens unit driving member and positions of the first and second lens units in the direction of the optical axis, viewed from the direction of a white arrow in FIG. 3.
Figure 7:
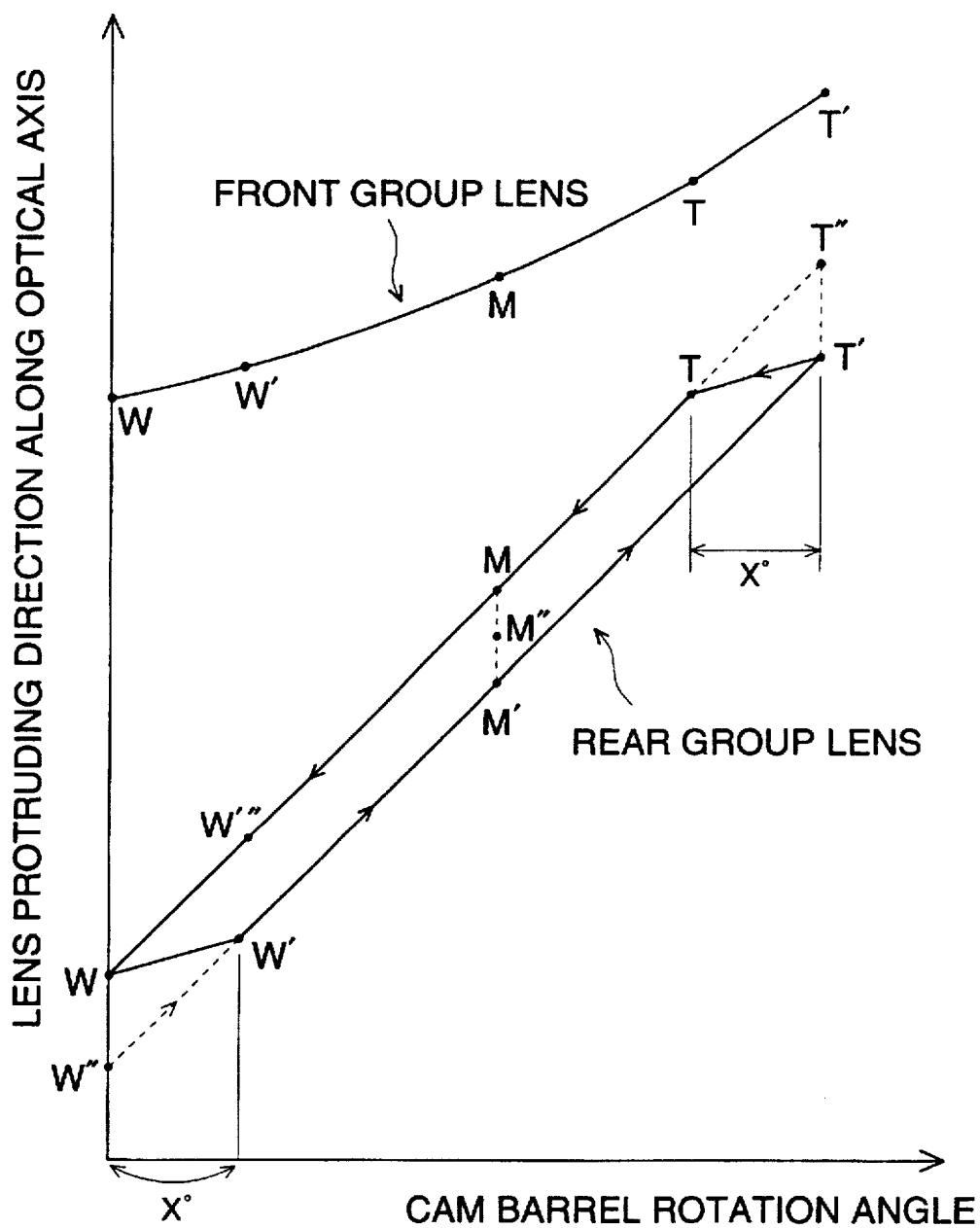
FIG. 7 is a graph showing a rotation angle of the first and second lens unit driving member and positions of the first and second lens units in the direction of the optical axis.
Figure 8:
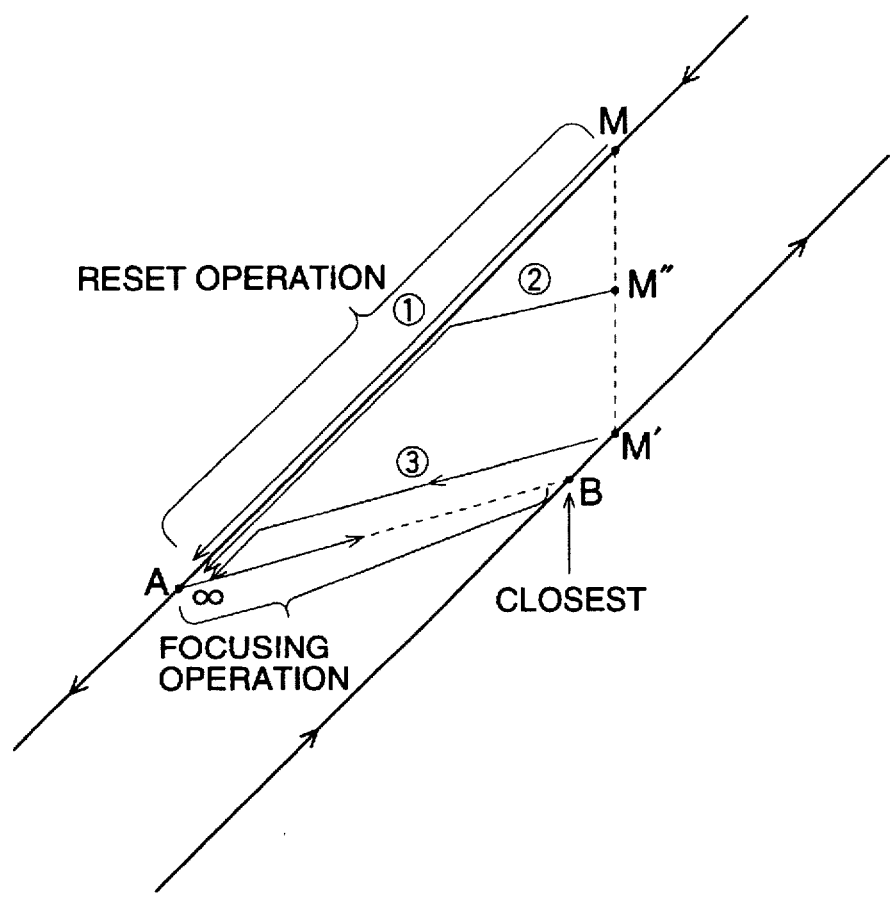
FIG. 8 is a partial view of the graph in FIG. 7, showing the focusing movement of the second lens unit.
Figure 9:
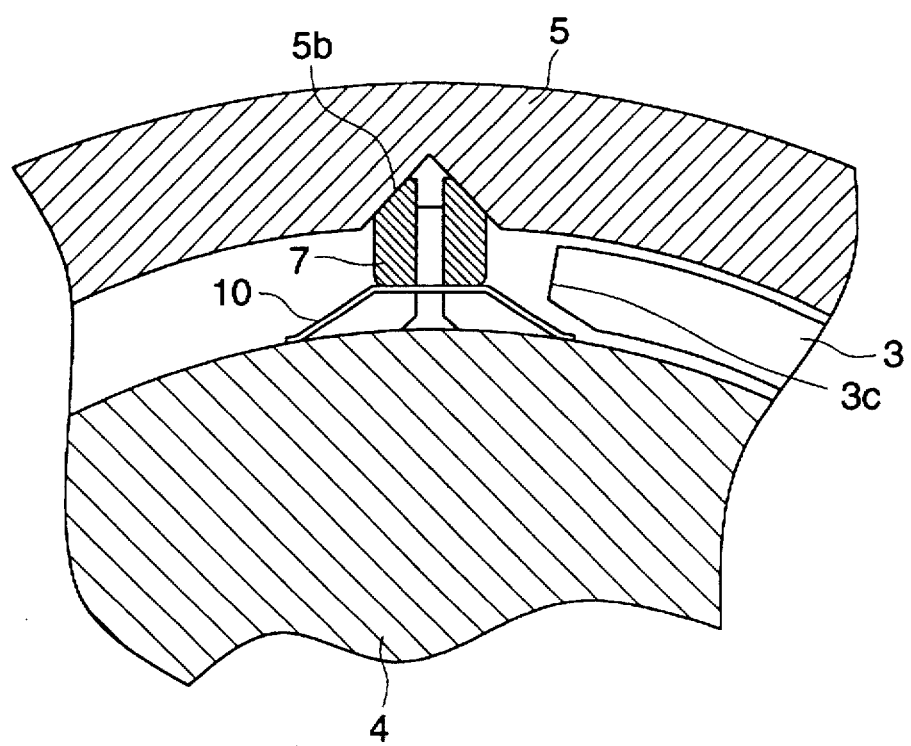
FIG. 9 is a partial view of the FIG. 1, showing engagement of the first and second lens unit driving member with the second lens unit.

FIG. 1 is a sectional view, including an optical axis, which shows an example of a magnification and focus adjustment control device of the present invention. FIGS. 2 and 3 are partial sectional views, perpendicular to the optical axis, which show rotating conditions of a second lens unit, viewed from the rear surface-side. FIGS. 4, 5 and 6 are developed plan views, viewed from the direction of a white arrow in FIG. 3, which show the relationship of the rotational position of the first and second lens unit driving member, and positions of the first and second lens units along the optical axis. FIG. 7 is a graph showing the relationship of rotation angles of the first and second lens unit driving member, and positions of the first and second lens units along the optical axis. FIG. 8 is a partial view of the graph in FIG. 7 showing the focusing movement of the second lens unit. FIG. 9 is a partial view of FIG. 1, showing engagement of the first and second lens unit driving member with the second lens unit.

The magnification and focus adjustment control device shown in the drawings is composed of a zoom lens in which magnification is changed and the focal point is adjusted, when the distance between a front group lens 1, which is the first lens unit, and a rear group lens 2, which is the second lens unit, and their distances to the film surface are changed. The front lens group 1 is held by a front group sliding frame 3. The sliding frame 3 is engaged with a linear movement guide plate 6 and is guided in parallel with the optical axis, and moves forward and backward in the direction of the optical axis without rotating, accompanying the rotation of a cam barrel, when a cam pin 3a studded on the outer surface is engaged with a cam groove 5a, which is provided on the inner surface of the rotatable cam barrel 5 which is a first and second lens unit driving member, and which is a guiding means of the front group lens 1.

The rear group lens 2 is held by a rear group sliding frame 4, and the rear group sliding frame 4 is held to be rotatable and slidable in the direction of the optical axis while being held inside the front group sliding frame 3. As shown in FIGS. 2 and 3, the rotating range of the rear group sliding frame 4 is within an angle X° in which the cam pin 7 studded on the rear group sliding frame 4 comes into contact with wall surfaces 3b and 3c which are in parallel with the optical axis of the front group sliding frame 3, which is the second guiding means, and its movement is limited. The cam pin 7 is engaged with a cam groove 5b which is the first guiding means provided on the inner surface of the cam barrel 5. Therefore, the cam pin 7 comes into contact with the wall surface 3b or 3c of the front group sliding frame 3, which stops its rotation. The cam pin 7 does not rotate and slides in the cam groove 5b, and moves forward and backward in the direction of the optical axis along the wall surface 3b or 3c by the rotation of the cam barrel 5. Thereby, the rear group sliding frame 4, that is, the rear group lens 2 moves forward and backward in the direction of the optical axis, and the change of the magnification is performed in conjunction with the front group lens 1.

In this connection, not only the rotating range of the rear group sliding frame 4 is limited by the contact of the cam pin with the wall surface as shown in the drawing, but also the range may be limited by the contact of a protrusion provided on the rear group sliding frame 4 with the wall portion of the front group sliding frame 3.

As shown in FIG. 1, an outer helicoid 5c and a zoom gear 5d are provided on the outer periphery of the cam barrel 5. The outer helicoid 5c is engaged with a helicoid 8a of the inner surface of a fixed barrel 8, and the zoom gear 5d is engaged with a motor gear 9. This outer helicoid 5c and the helicoid 8a structure a cam barrel guiding means. Accordingly, when the motor gear 9 is rotated by a reversible motor, not shown in the drawing, which is a driving means to provide the driving force to the first guiding means, then, the cam barrel 5 moves forward and backward in the direction of the optical axis while rotating. A straight advancing groove 7b is provided on the inner surface of the fixed barrel 8, and a straight advance guiding plate 6 is engaged with the groove 7b. This zoom lens barrel is generally referred to as 2-step protruding lens barrel because the cam barrel moves forward and backward while being rotated.

When the status of the cam pin 7 of the rear group sliding frame 4 and the cam barrel 5 are determined as the initial position, and the cam barrel 5 is rotated in the arrowed direction, the cam pin 7, that is, the rear group sliding frame 4, is rotated together with the cam barrel 5 because the cam pin 7 is engaged with the cam groove 5b of the cam barrel 5, and moves to the position shown in FIG. 3. During that step, the relative position in the direction of the optical axis of the cam pin 7, that is, the rear group sliding frame 4 with the cam barrel 5, is not changed. Then, when the cam pin 7 moves to the position shown in FIG. 3 in which the cam pin 7 is in contact with the wall surface 3c in parallel to the optical axis of the front group sliding frame 3, and the cam barrel is further rotated in the arrowed direction, then, the cam pin 7, that is, the rear group sliding frame 4, is prevented from rotating by the wall surface 3c, and the cam pin 7 is moved along the cam groove 5b and the wall surface 3c, and the rear group sliding frame 4 moves in the direction of the optical axis.

FIGS. 4, 5 and 6 respectively correspond to the status in FIG. 2, FIG. 3, and the status in which the cam barrel 5 is further rotated. Even when the cam barrel is rotated so as to move the cam pin from the initial position in FIG. 4 to the status in FIG. 5 in which the cam pin comes into contact with the wall surface 3c, by the engagement of the cam pin 7 with the cam groove 5b, the relative position of the cam barrel 5 with the cam pin 7 in the direction of the optical axis is not changed. Because the cam barrel is engaged with the fixed barrel 8 by the helicoid, and moves forward while rotating, the cam pin 7, that is, the rear group sliding frame 4 moves forward in the direction of the optical axis accompanying the movement of the cam barrel 5. In contrast to this, the front group sliding frame 3 guided by the straight advance guiding plate 6 is further moved in the direction of the optical axis along the lead of a cam groove 5a because the cam pin 3a studded on the outer surface is engaged with the cam groove 5a on the inner peripheral surface of the cam barrel 5. As a result, when the cam barrel 5 rotates from the position in FIG. 4 to the position in FIG. 5, the front group lens 1 and the rear group lens 2 move relative to each other in the direction in which the distance between them becomes larger.

When the cam barrel 5 is further rotated from the position in FIG. 5, the cam pin 7 is moved along the cam groove 5b and the wall surface 3c because the rotation of the cam pin 7 following the cam barrel 5 is blocked by the wall surface 3c in parallel to the optical axis. As a result, the rear group sliding frame 4 moves in the direction of the optical axis also with respect the cam barrel 5. During the above movement, the front group sliding frame 3 moves in the direction of the optical axis by the front group cam groove 5a of the cam barrel 5 in the same manner as the above-described movement. In the case where the lead of the rear group cam groove 5b is larger than that of the front group cam groove 5a (a spiral angle of the rear group cam groove 5b is larger than that of the front group cam groove 5a), when the cam barrel 5 is rotated from the position in FIG. 5 to the position in FIG. 6, the front group lens 1 and the rear group lens 2 are relatively moved in the direction in which the interval between them becomes smaller.

FIG. 7 shows the movement of the front group lens 1 and the rear group lens 2 in the direction of the optical axis, by the above-described rotation of the cam barrel 5. The front group lens 1 moves as shown by the graph in FIG. 7, which shows the total feeding amount in the direction of the optical axis by the outer helicoid 5c of the cam barrel 5 and that by the front group cam groove 5a. For the rear group lens 2, the position in FIG. 4 is defined as an initial position W of the graph, and then, when the cam barrel 5 rotates by an angle of X°, the rear group lens 2 moves to the W' position as shown in FIG. 5. This movement is the movement in the direction of the optical axis by the feeding motion of the outer helicoid 5c. When the cam barrel 5 is further rotated, the rotation of the cam pin 7, following the cam barrel 5, is blocked by the wall surface 3c parallel to the optical axis of the front group sliding frame 3, and the cam pin 7 moves in the direction of the optical axis along the cam groove 5b and the wall surface 3c. The amount of this movement and that of the feeding motion by the outer helicoid 5c are summed up, and thereby, the rear group lens 2 moves in the direction of the optical axis as shown by W'→M'→T' in the graph (the status in FIG. 6).

Next, when the rotation of the cam barrel 5 is reversed, after the rear group lens 2 arrives at the T' position, the rear group lens 2 is integrally moved with the cam barrel 5 and stops at the T position after the rotation of X°. The movement during T→T' is the feeding movement in the direction of the optical axis by the outer helicoid 5c of the cam barrel 5. When the cam barrel 5 is further rotated, the rotation of the cam pin 7, following the cam barrel 5, is blocked by the wall surface 3b in parallel to the optical axis of the front group sliding frame 3, and then, the cam pin 7 slides along the cam groove 5b and the wall surface 3b and moves in the direction of the optical axis. The rear group lens 2 moves as shown by T→M→W on the graph, by the total of the above movement and the feeding motion by the outer helicoid 5c of the cam barrel 5. As can clearly be seen from the above, the rear group lens 2 normally exists in the quadrilateral area of W→W'→T'→T.

In the case where the front group lens 1 stops at an arbitrary intermediate position M, the rear group lens 2 positions at M' when the front group lens or the rear group lens extends from W, and positions at M when the front group lens or the rear group lens is retracted from T. As described above, even when the cam pin 7 is engaged with the cam groove 5b so that the cam pin 7 does not slide with respect to the cam groove 5b due to the friction force, it can be considered that the cam pin 7 slides with respect to the cam groove 5b when a camera has some impact thereon during zooming or after zooming. In such cases, the rear group lens 2 positions at any position of M" between M and M'. In the same manner, there is a possibility that the rear group lens 2 positions at W" or T", when the cam pin 7 slides by an impact, in the case where the rear group 2 positions at W or T position. However, that is only in cases in which the cam groove 5b is extended to the retracting-side of the rear group lens 2 beyond the W position, or to the protruding-side beyond the T' position. In this case, the rear group lens 2 positions in the quadrilateral area of W"→T'→T"→W.

Relating to FIG. 8, the position in the direction of the optical axis of the rear group lens 2 corresponding to the front group lens 1 at an arbitrary intermediate position M, is M' when the rear group lens 2 is protruded from W, and is M when the rear group lens 2 is retracted from T. When the cam pin 7 slides with respect to the cam groove 5b by an impact applied on the camera, the rear group lens 2 positions at M", which is any position between M' and M.

In order to carry out both of the magnification change operation and the focusing operation by the rotational operation of the cam barrel 5, which is the object of the present invention, it is preferable to return the position of the rear lens group 2 to the same position even when the rear lens group 2 positions at any of M, M' or M". This operation is referred to as the resetting operation. In the example shown in FIG. 8, the reset operation is carried out when the shutter button is half depressed and the cam barrel 5 is rotated by (X+α)° in the retracting direction, that is, in the direction in which the cam barrel rotation angle shown in FIGS. 7 or 8 decreases from the right to the left in FIG. 8, the rear group lens 2 arrives at the reset position of point A from the point M along the track ①. In the same manner, the rear group lens 2 arrives at the point A from the point M" along the track ②, and arrives at the point A from the point M' along the track ③.

By the resetting operation as described above, even when the rear group lens 2, corresponding to the front group lens 1 located at a predetermined position, is located at any arbitrary position, the rear group lens 2 can be returned to the same point A position. Further, when the resetting operation is carried out when the shutter button is half depressed, the impact is not applied upon the camera after that time, and thereby, there is no practical problem even when a relatively insecure engaging method, in which the cam pin 7 is integrated with the cam groove 5b by the friction force, is used.

In this connection, when the integrated condition of the cam pin 7 with the cam groove 5b is firm, the resetting operation may be carried out just after the zooming operation. Further, the rotational direction of the cam barrel 5 at the time of focusing operations may be reversed, depending on the position of the rear group lens 2, without conducting the resetting operation.

At the point A, at which the focusing operation is carried out following to the above operation, the front group lens 1 and the rear group lens 2 can focus on the subject at infinity, according to the cam diagram determined by the lens design. When the cam barrel 5 is rotated in the protruding direction from the point A, the front group lens 1 advances linearly. In contrast to this, the rear lens group 2 is advanced in the direction of the optical axis by the outer helicoid 5c of the cam barrel 5 under the condition that the rear group lens 2 is integrated with the cam groove 5b. Accordingly, the interval between the front group lens 1 and the rear group lens 2 becomes larger compared to the case in the point A, and the focus can be adjusted on the closest point. The position B of the rear group lens 2, in which the cam pin 7 is in contact with the wall surface 3c of the front group sliding frame 3, is the closest position of the camera specification. That is, the rotation angle X°, in the protruding direction of the rear group lens 2 of the cam barrel 5, in which the cam pin 7 in contact with the wall surface 3b of the front group sliding frame 3 comes into contact with the wall surface 3c, is also a rotation angle for focusing from infinity to the closest point. The rotation angle X° is a value determined by the changed amount of the relative interval between the front group lens 1 and the rear group lens 2 from infinity to the closest point in the lens design, and leads of the outer helicoid 5c of the cam barrel 5 and the cam grooves 5a and 5b.

The point A and the closest point B need not always be positions in which the cam pin 7 comes into contact with the wall surfaces 3b and 3c, but the points A and B may be respectively positions, which are electrically shifted in the direction of the inside of the focusing area, that is, the point A may be a point in which the cam barrel 5 is protruded for several pulses, and the point B may be a point in which the cam barrel 5 is moved under the condition that several pulses are insufficient. Further, in cases of the front group linear movement and the rear group non-linear movement, an image forming position on the closest side is shifted by the zoom position in the 2-step or multiple step protruding lens barrel. Accordingly, it is effective to follow the track of the front group nonlinear movement, the rear group linear movement, or the both-group nonlinear movement so that the image forming position on the closest-side is the same position in any zoom position. That is accomplished by the cam grooves 5a and 5b.

Due to the structure described above, both of the continuous magnification change and focus adjustment of the zoom lens can be accomplished only by the rotational movement of the cam barrel 5. In this connection, when the pressure-contact mechanism shown in FIG. 9 is adopted in order to set an appropriate value, by which switching of the relative movement condition is carried out as described in FIGS. 4, 5 and 6, to the static frictional force of the cam pin 7 and the cam groove 5b, then, the setting can be easily carried out. The pressure-contact mechanism is adopted to adjust the pushing force of the cam pin 7 in the cam groove 5b by controlling the force of a leaf spring 10. Further, when the mechanism is structured such that the leaf spring 10 is pushed downward by the wall surface 3c or 3b of the front group sliding frame 3 as shown in FIG. 9, the engaged condition of the cam groove 5b with the cam pin 7 can be released only during the zooming operation.

The present invention is not limited to the example in which frictional force is used for integration force of the cam pin 7 and the cam groove 5b, and in fact, there is no problem in cases where integration or release of the integration of the cam pin 7 with the cam groove 5b is carried out by using the electromagnetic force, or mechanical parts such as a click, a ratchet, etc. Further, focusing may be carried out from the closest point to infinity by an operation in which resetting is carried out in the protruding direction which is reverse to the retracting direction shown in FIG. 8. Furthermore, the present invention is not limited to the so-called 2-step protruding lens barrel in which the cam barrel 5 shown in the drawings advances while being rotated, but the present invention can also be applied for an ordinary lens barrel in which the cam barrel does not advance, or the 3-step or multiple step protruding lens barrel. Still further, in the example shown in the drawings, the rear group lens 2 is held in the front group sliding frame 3 of the front group lens 1, however, it may be structured such that, for example, the holding portion is extended by the fixed barrel 8, and the rear group lens 2 is held by the holding portion.

In the magnification and focus adjustment control device of the present invention, when the second lens unit of the first and second lens units which are respectively moved in the direction of the optical axis by the rotation of the first and second lens units driving member, driven by the reversible motor, is guided by the first and second guiding means, a continuous change of magnification is carried out, and focusing is carried out from infinity to the closest point after the guide of the second guiding means is released.

The present invention will be described next, referring to FIG. 10 through FIG. 13, which show another embodiment of the present invention, however, the present invention is not limited to the present embodiment.

Figure 10:
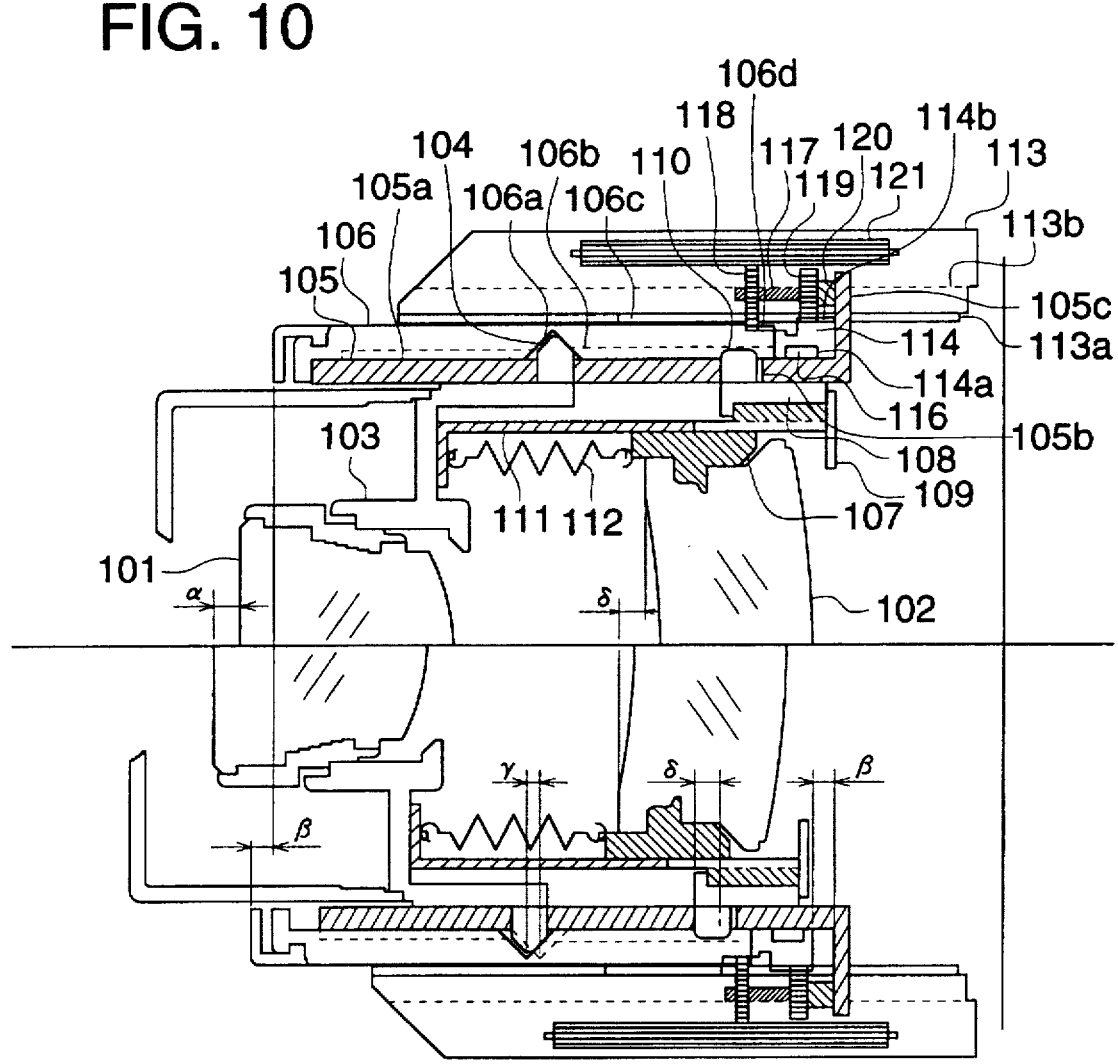
FIG. 10 is a sectional view of a zoom lens barrel of the present invention, which includes the optical axis of the magnification ratio and focus adjustment control device.
Figure 11:
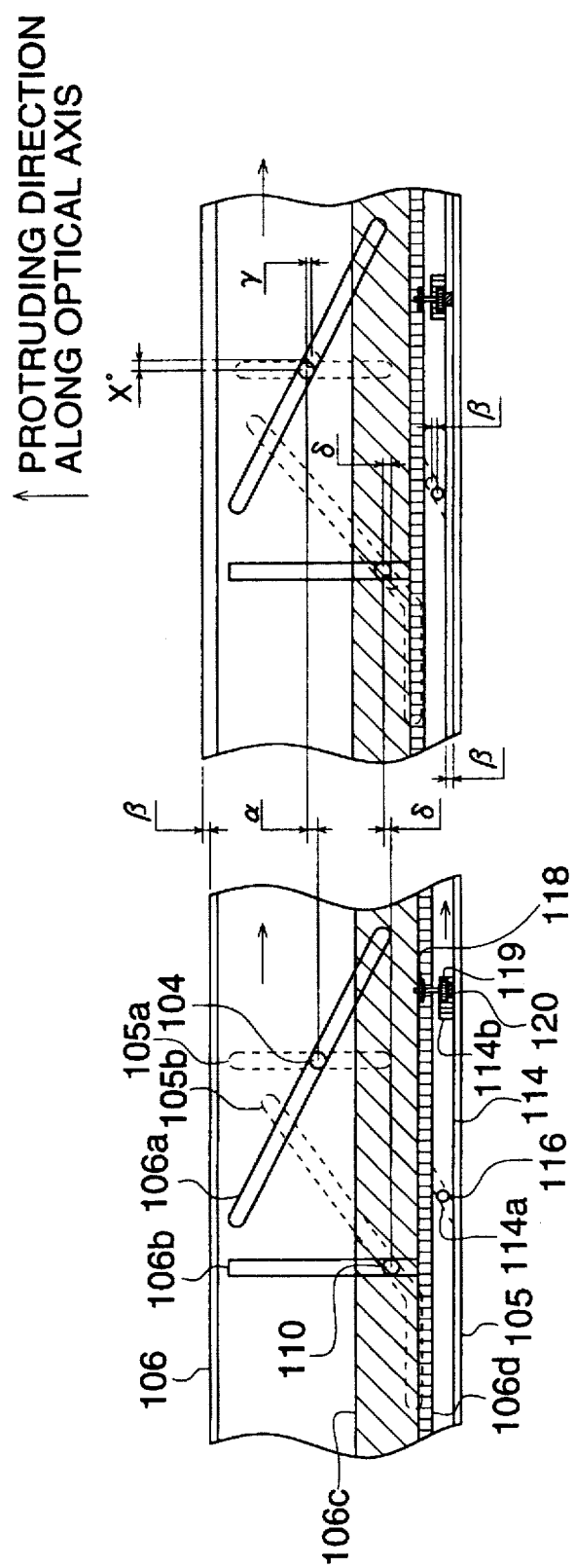
FIGS. 11(a) and 11(b) are perspective views of the zoom lens barrel of the present invention, showing the relationship of connected parts of the magnification ratio and focus adjustment control device, seen through the outer surface of the lens barrel.

FIG. 10 is a sectional view of the plane through the optical axis, showing an embodiment of the magnification and focus adjustment control device of a zoom lens barrel of the present invention. In FIG. 10, the upper-half portion above the optical axis shows the condition of setting of the zoom magnification, and the lower half portion shows the condition of focus adjustment.

FIGS. 11(a) and 11(b) are views, seen through the outer surface of the lens barrel, which show the connected relationship of the cam barrel 106, which is a rotational body and will be described later, a linear motion guide ring 105, and a phase difference ring 114 which is a ring member. FIG. 11(a) corresponds to the condition of the zoom magnification setting shown in the upper half portion above the optical axis in FIG. 10, and FIG. 11(b) corresponds to the condition of focusing shown in the lower half portion below the optical axis in FIG. 10. Here, grooves, cut in the cam barrel 106, are shown by a solid line, a groove of the linear motion guide ring 105 is a broken line, and a groove of the phase difference ring 114 is shown by a dotted line. Further, the upper direction of FIGS. 11(a) and 11(b) corresponds to the protruding direction along the optical axis, and the right direction in FIGS. 11(a) and 11(b) corresponds to the rotational direction of the cam barrel 106 during the protruding operation.

The zoom lens shown in the drawings is structured such that a front group lens 101, which is the first lens unit (hereinafter, referred to as the front group lens), and a rear group lens 102 which is the second lens unit (hereinafter, referred to as the rear group lens) change the distance between them and the distance to the film surface, and thereby, magnification adjustment and focusing are performed.

Next, referring to FIGS. 10, 11(a) and 11(b), the relative relationship of the cam barrel 106 which is a rotational body and the first guiding means (hereinafter, referred to as the cam barrel), and the linear motion guide ring 105 which is the second guiding member (hereinafter, referred to as the linear motion guide ring), and forward and backward operations in the optical axis of the front group lens 101 and the rear group lens 102 by the rotation of the cam barrel 106, will be described.

In FIGS. 10, 11(a) and 11(b), the front group lens 101 is held by the front group sliding frame 103, a front group cam pin 104 studded on the front group sliding frame 103 penetrates a linear motion groove 105a, shown in FIGS. 11(a) and 11(b), on the linear motion guide ring 105, and is engaged with the front group cam groove 106a which is the first sliding groove (hereinafter, referred to as the front group cam groove) on the cam barrel 106. Thereby, the front group sliding frame 103, holding the front group lens 101, carries out the forward and backward operation along the optical axis without being rotated when the cam barrel 106 is rotated.

The rear group lens 102 is held by the rear group lens frame 107 sandwiched between the rear group sliding frame 108 and a light shielding mask 109, and the rear group sliding frame 108 and the rear group lens frame 107 are released in the rotational direction. A front group cam pin 110 is studded on the rear group sliding frame 108, and penetrates a rear group cam groove 105b, which is the second sliding groove (hereinafter, referred to as the front group cam groove) on the linear motion guide ring 105, and is engaged with a linear motion groove 106b on the cam barrel 106. Thereby, the rear group sliding frame 108 carries out the forward and backward operations while being rotated, when the cam barrel 106 is rotated. Herein, the rotation of the rear group lens frame 107 is limited by a linear motion guide plate 111 attached onto the front group sliding frame 103. Thereby, the rear group lens frame 107 carries out the forward and backward operations in the optical axis without being rotated when the cam barrel 106 is rotated.

Further, the front group sliding frame 103 and the rear group lens frame 107 are forced by a spring 112 in the direction in which both frames approach each other. Thereby, the front group cam pin 104 and the rear group cam pin 110 respectively move along the respective side of end surfaces of the front group cam groove 106a and the rear group cam groove 105b. In this connection, the spring 112 may be a compression spring.

A helicoid 106c is provided on the outer surface of the cam barrel 106, and is engaged with an inner surface helicoid 113a of a fixed barrel 113. Accordingly, when the cam barrel 106 is rotated, the cam barrel 106 itself is also moved forward and backward along the optical axis. In this way, the lens barrel in which the cam barrel 106 also moves forward and backward in the optical direction, is generally called a 2-step protruding lens barrel.

A phase difference ring 114, made of a ring-shaped member having a phase difference groove 114a which is a sliding groove to hold the linear motion guide ring 105 at a predetermined position along the optical axis, with respect to the movement of the cam barrel 106 along the optical axis when the cam barrel 106 is rotated, is provided in the rear portion of the cam barrel 106. The phase difference ring 114 is integrally connected with the cam barrel 106 along the optical axis, and is connected to the cam barrel 106 by a connecting member, not shown in the drawings, so as to be released in the rotational direction. A phase difference pin 116 is studded on the linear motion guide ring 105 and is engaged with a phase difference groove 114a in the phase difference ring 114. The relationship of the phase difference ring 114 and the linear motion guide ring 105, is the same as the relationship in which the phase difference pin is studded on the phase difference ring 114, the phase difference groove is provided in the linear motion guide ring 105, and the phase difference pin is engaged with the phase difference groove.

A rear end portion 105c of the linear motion guide ring 105 is engaged with a linear motion groove 113b provided inside the fixed barrel 113. Therefore, the linear motion guide ring 105 can not rotate, but is moved forward and backward in the direction of the optical axis.

The rear end portion 105c is connected to a zoom finder lens, not shown in the drawing, and the magnification operation of the zoom finder is carried out by the forward and backward operations of the rear end portion 105c in the direction of the optical axis.

Further, a gear shaft 117 is studded on the rear end portion 105c, and a zooming gear 118 and a phase gear 119 are attached onto the gear shaft 117. A slip clutch mechanism 120 is attached to the phase gear 119, and when a stopping load is applied onto the phase gear 119, the gear shaft 117 and the phase gear 119 are run idly each other. The phase gear 119 is engaged with a gear 114b on the phase difference ring 114. The zooming gear 118 is engaged with a gear 106d on the cam barrel 106, and is further engaged with a motor gear 121 which is long in the direction of the optical axis. Thereby, when a zoom motor, not shown in the drawings, rotates, and the motor gear 121 is rotated, the zooming gear 118 and the phase gear 119 are rotated, and thereby, the cam barrel 106 and the phase difference ring 114 are rotated.

Herein, rotation of the phase difference ring 114 is restricted so that it can not be rotated more than a predetermined number of rotations, and when the phase gear 119 is rotated and exceeds the predetermined rotational range, the slip clutch mechanism 120 functions so that the phase gear 119 rotates idly with respect to the gear shaft 117.

The above description is an explanation of the composition of parts and the connection and operation of an embodiment of the present invention, in which the cam barrel 106, which is the first guiding means, and the linear motion guide ring 105, which is the second guiding means, are mainly described.

Next, the focusing operation and the magnification operation of the present embodiment will be described referring to the lower half portion, below the optical axis, of the view in FIG. 10.

In this connection, the sectional view of the cam groove, shown by a dotted line in the cam barrel 106 and the linear motion guide ring 105 shown in the lower half portion of the view, shows the position of the cam groove in the upper half portion of the view.

In FIG. 10, when the zoom motor, not shown in the drawing, is rotated and subsequently the cam barrel 106 is rotated, the cam barrel 106 moves forward along the optical axis by the amount of the movement of $\beta$, while being rotated, by the action of the helicoid 106c of the outer surface of the cam barrel 106 and the helicoid in the inner surface of the fixed barrel 113. Herein, the studded front group cam pin 104 is in contact with the front group cam groove 106a of the cam barrel 106 under the condition that rotation of the front group sliding frame 103 is restricted by the linear motion guide ring 105, and thereby, the front group sliding frame 103 is moved by the amount of movement of $\alpha$ in the direction of the optical axis without being rotated, wherein the amount of movement of $\alpha$ is obtained by the composition the amount of movement of $\gamma$ by the cam groove and the amount of forward movement of $\beta$ of the cam barrel 106 itself.

Further, the rotation of the rear group lens frame 107 is restricted by the linear motion guide plate 111 on the front group sliding frame 103. A rear group cam pin 110, studded on the rear group sliding frame 108 holding the rear group lens frame 107, penetrates the rear group cam groove 105b of the linear motion guide ring 105, and is engaged with a linear motion groove 106b on the cam barrel 106, and thereby, the rear group lens frame 107 is moved in the direction of the optical axis by the rotation of the cam barrel 106 without being rotated.

Herein, when the cam barrel 106 and the linear motion guide ring 105 are integrally moved, the amount of movement of the rear group lens 2 is obtained by composing the amount of movement of $\beta$ of the cam barrel 106 and the amount of the movement of $\delta$ by the rear group cam groove 105b of the linear motion guide ring 105. However, in the present invention, the rear group lens 2 is moved in the direction in which the cam barrel 106 and the linear motion guide ring 105 are separated from each other, within the range of the focusing operation.

The above operation can be performed by the phase difference ring 114, which is a means for changing the interval in the direction of the optical axis between the cam barrel 106, which is the first guiding means, and the linear motion guide ring 105, which is the second guiding means.

That is, when the phase difference ring 114 is rotated by a phase gear 119, synchronized with the rotation of the cam barrel 106, a phase difference pin 116, studded on the linear motion guide ring 105, is moved in the direction of the optical axis along a phase difference groove 114a on the phase difference ring 114, and thereby, the linear motion guide ring 105 is displaced with respect to the cam barrel 106. Herein, when the amount of the movement of the linear motion guide ring 105 by the phase difference groove 114a is equal to the amount of the movement of $\beta$ of the cam barrel 106, then, the movement of the linear motion guide ring 105 is canceled out with respect to the movement of the cam barrel 106, and thereby, the relative position of the linear motion guide ring 105 to the fixed barrel 113 is not changed. Accordingly, the amount of the movement of the rear group lens 102 is composed of only the amount of movement of $\delta$ by the rear group cam groove 105b.

Due to the above-described movement of the phase difference ring 114, the following effects are attained.

The first effect is as follows:

Because the amount of the movement of the rear group lens 102 is only $\delta$, as compared with the amount of movement of the front group lens 101 being β+γ=α, a near point can be focused in the lower half portion, below the optical axis, of the view, compared to the upper half portion, above the optical axis, of the view in FIG. 10. That is, when the upper half portion of the view shows the situation in which the subject at the infinity can be focused, and when the lower half portion of the view shows the situation in which the closest subject can be focused, then, focusing can be carried out at any position in the entire zooming range.

The second effect is as follows:

Within the rotation range of the phase difference ring 114, the linear motion guide ring 105 does not change its relative position with respect to the fixed barrel 113, and thereby, the variable magnification operation is not carried out on the zoom view finder, to which the driving force is applied by the rear end portion 105c of the linear motion guide ring 105.

Various cases can be considered relating the amount of the movement of the phase difference groove 114a in the phase difference ring 114. For example, when the amount of the movement is β+δ, it can be realized that the position of the rear group lens 102 is not changed. Due to this method, the focusing operation becomes the so-called pure front group focusing operation, and the focusing position can be equal from infinity to the closest position in the entire zoom range. In this case, the linear motion guide ring 105 is moved backward by the amount of the movement of δ. In this case, when the moving force of the rear group sliding frame 108 in the direction of the optical axis is used as the view finder lens driving force, the magnification ratio of the view finder is not changed during the focusing operation.

In this connection, even when the amount of the movement of the phase difference ring 114 is β, the focusing position from the infinity to the closest position can be equal in the entire zoom range, when the moving track of the rear group cam groove 105b is made to be non-linear.

In FIGS. 11(a) and 11(b), when the cam barrel 106 is rotated clockwise by X°, the cam barrel 106 itself is moved forward in the amount of movement of β by the helicoid 106c. Simultaneously, in relation of the front group cam groove 106a on the inner surface of the cam barrel 106, and the linear motion groove 105a on the linear motion guide ring 105, the front group cam pin 104 is moved forward with respect to the cam barrel 106 in the amount of movement of γ. That is, the amount of movement of the front group cam pin 104 with respect to the fixed barrel 113 is β+γ=α.

In the same manner, in relationship of the linear motion groove 106b on the inner surface of the cam barrel 106 and the rear group cam groove 105b on the linear motion guide ring 105, the rear group cam pin 110 is moved forward with respect to the linear motion guide ring 105 by the amount of movement of δ. Herein, the phase difference ring 114, integrally connected with the cam barrel 106 in the direction of the optical axis, is synchronously rotated with the cam barrel 106. By the relationship of the phase difference groove 114a on the inner surface of the phase difference ring 114, and the phase difference pin 116 studded on the linear motion guide ring 105, the linear motion guide ring 105 is moved backward with respect to the cam barrel 106 by the amount of movement of β.

Because this amount of backward movement is equal to the amount of the forward movement of the cam barrel 106, the amount of the movement of the linear motion guide ring 105 is canceled, and thereby, the linear motion guide ring 105 is not moved with respect to the fixed barrel 113. Further, the amount of the forward movement of β of the cam barrel 106 itself is not added to the rear group cam pin 110, and the rear group cam pin 110 is moved forward only by the amount of movement of δ.

By the composition described above, when the situation is changed from FIG. 11(a) to FIG. 11(b), the interval between the front group lens 101 and the rear group lens 102 is increased, as compared with the normal zooming track, and thereby, focusing is conducted. That is, FIG. 11(a) shows focusing at infinity, and FIG. 11(b) shows focusing on the closest position. That is, the rotational angle of X° from the situation in FIG. 11(a) to that in FIG. 11(b), is determined by cam grooves 106a and 105b, a spiral angle of the helicoid 106c, and the changed amount of the mutual interval between the front groove lens 101 and the rear groove lens 102 from infinity to the closest position in the lens design.

Further, the relative position of the linear motion guide ring 105 in the range of X° is not changed with respect to the fixed barrel 113, and thereby, the zoom view finder, to which driving force is applied by the rear end portion 105c of the linear motion guide ring 105, does not carry out the variable magnification operation, and maintains a predetermined magnification ratio.

In this connection, in cases where the zooming gear 118 and the phase gear 119 are on the same axis, and their pitch circles are the same, the rotational amount of the phase difference ring 114 is equal to an angle of X°, which is the same rotational amount as that of the cam barrel 106, by making a spiral angle of the helicoid 106c equal to that of the phase difference groove 114a. Of course, when the amount of movement β by the phase difference groove 114a is maintained, the spiral angle and the rotational amount may be any value.

Figure 12:
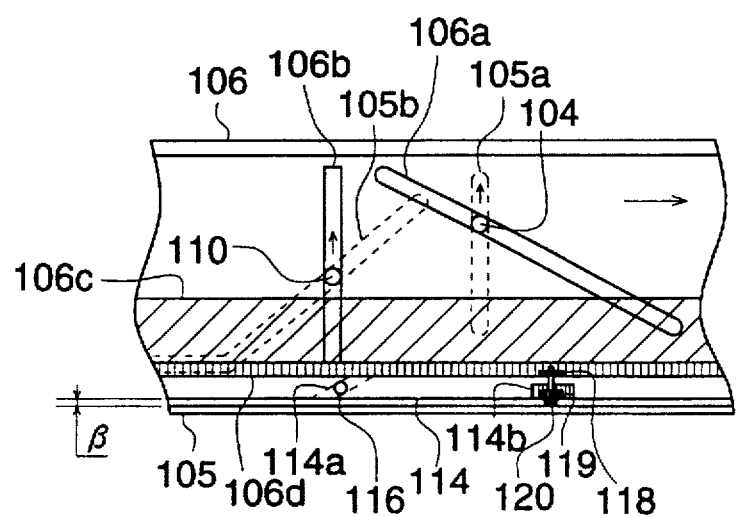
FIG. 12 is a view showing the situation in which the cam barrel in FIG. 11 is rotated further than in FIG. 11.

When the cam barrel 106 is further rotated from the situation in FIG. 11(b), the cam barrel 106 is moved to the situation as shown by FIG. 12.

In FIG. 12, the phase difference ring 114 can not be further rotated by a regulation member, not shown in the drawings, and the phase gear 119 can not be further rotated by a slip clutch mechanism 120. However, the zooming gear 118 can be further rotated, and thereby, the linear motion guide ring 105 is moved further forward by the operation of the helicoid 106c, while keeping the situation in which the linear motion guide ring 105 is moved backward with respect to the cam barrel 106 by the amount of movement of β. That is, when the lens protruding operation is carried out, the zoom magnification operation is carried out while focusing on the closest position. In contrast to that, when the lens retracting operation is carried out, the zoom magnification is changed while focusing on infinity.

Figure 13:
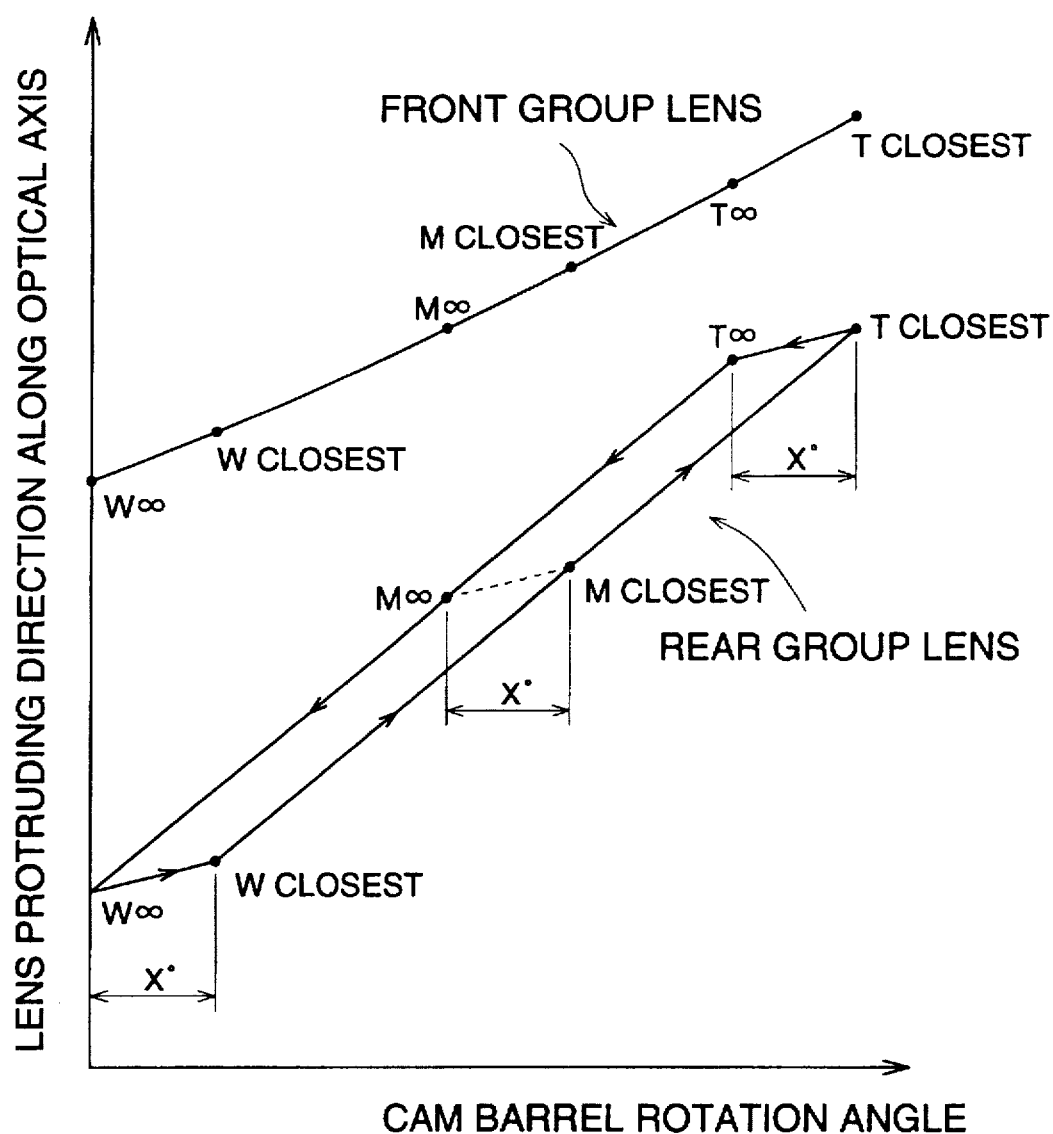
FIG. 13 is a graph of the zoom track.
Figure 14:
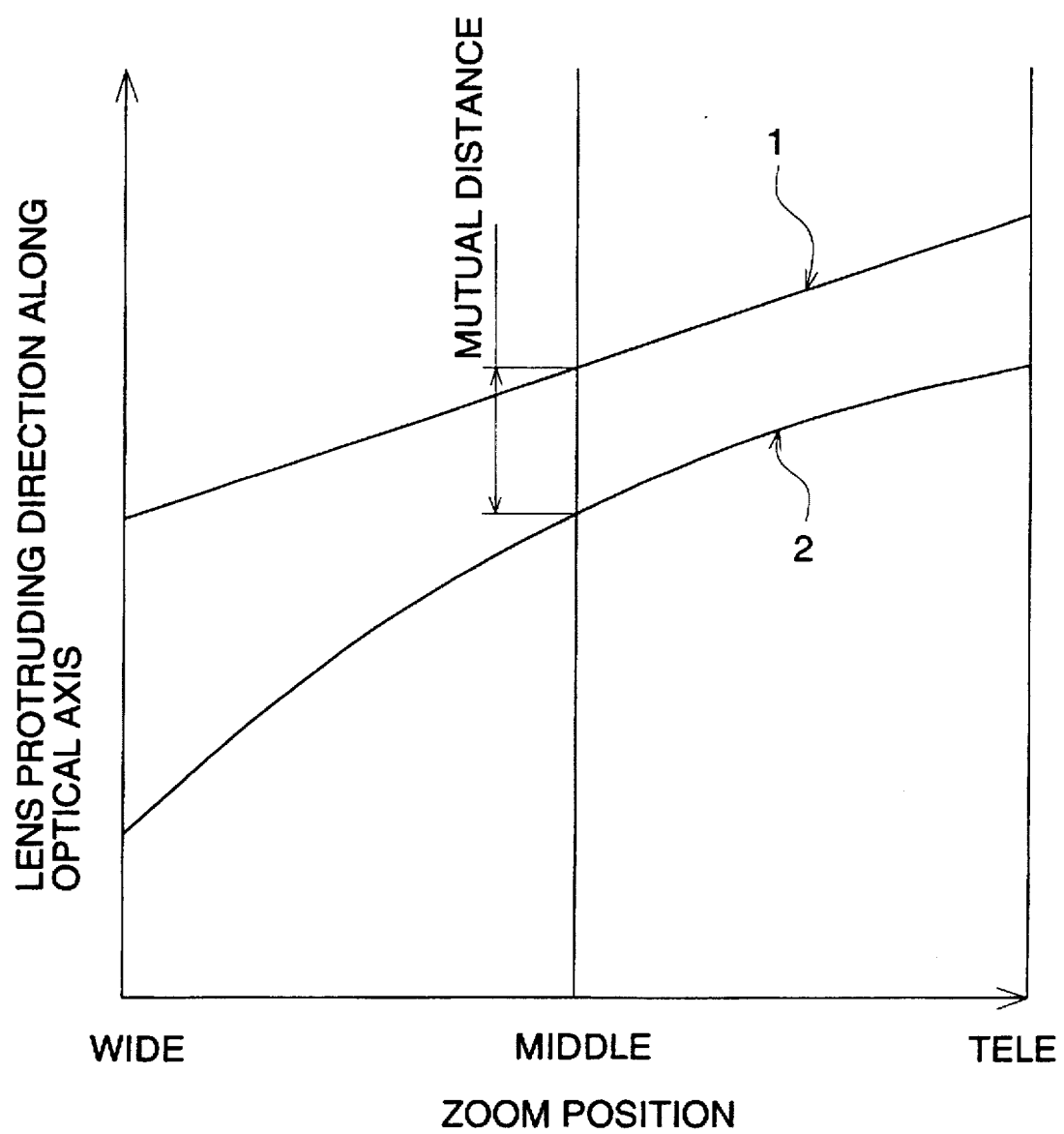
FIG. 14 is a view showing the mutual distance between the front-side lens and the rear-side lens.
Figure 16:
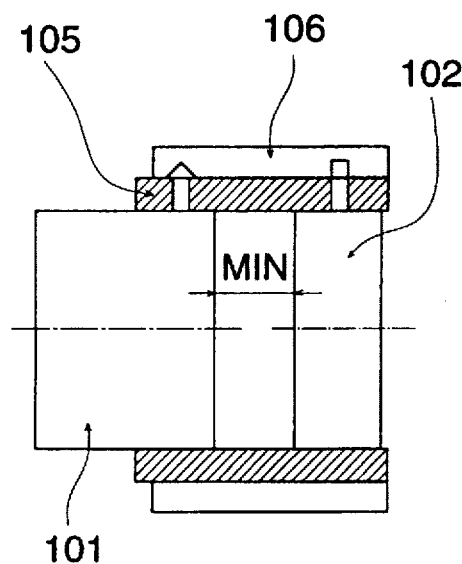
FIGS. 16(a), 16(b) and 16(c) are views showing that the mutual distance between 2 lens units is changed by changing the relative position of 2 guiding means.
Figure 16:
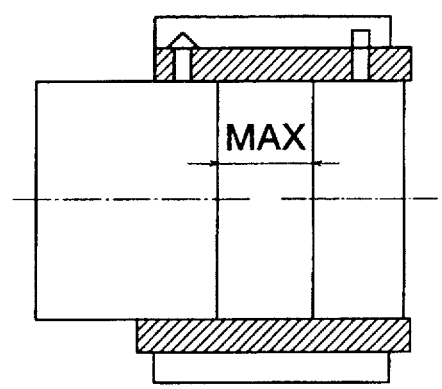
Figure 16:
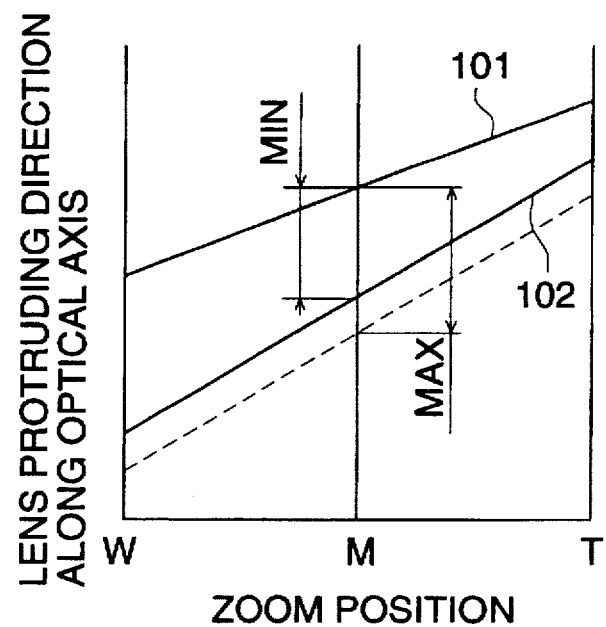
Figure 17:
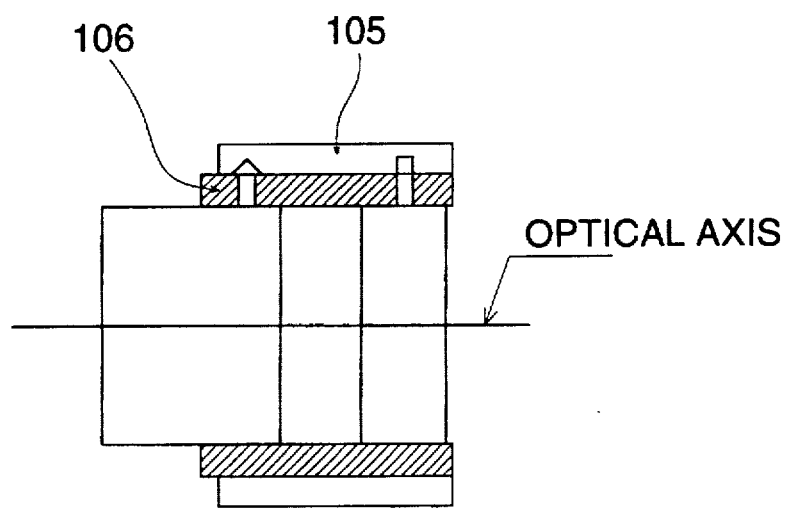
FIG. 17 shows a situation in which the relative position of 2 guiding means along the optical axis is changed.

FIG. 13 is a graph showing the zooming track.

In FIG. 13, the rear group lens 102 exists within a quadrangular area formed of W(wide angle) ∞ (infinity), W Closest, T (telephoto) Closest, and T ∞.

In cases where the focusing operation is carried out at an arbitrary intermediate point M, M Closest is in focus when the lens is protruded from W, and M ∞ is in focus when the lens is retracted from T. Therefore, in cases where the protruding operation is carried out, when the zooming operation is stopped at M Closest, rotation of the zoom motor is reversed, the cam barrel 106 is also reversely rotated by X°, and the rear group lens 102 is located at the M ∞ position. When the retracting operation is carried out, it is desirable that the lens is stopped at M ∞ as it is, and focusing operation is carried out in the lens protruding direction from the same initial position M ∞, that is, from infinity to the closest position.

Of course, the focusing operation may be carried out from the closest position to infinity by reversing the rotation of the motor. Further, the rotation of the motor is not reversed, and its status can be stored in the memory, whether the lens was stopped after protruding, or after retracting. When the lens is protruded, the focusing operation can be carried out from the closest position to infinity. When the lens is retracted, the focusing operation can be conversely carried out from infinity to the closest position.

In this connection, in the embodiment of the present invention, the front group lens 101 is moved in the direction of the optical axis by the cam barrel 106a, however, the font group lens 101 can also be moved in the direction of the optical axis by the helicoid instead of by the cam groove 106a.

Further, the present invention is not limited to the so-called 2-step protruding lens barrel in which the cam barrel 106 shown in the drawing is moved forward while rotating, but it can also be applied to an ordinary lens barrel in which the cam barrel is not moved forward, or a 3 or more step protruding lens barrel.

By another structure of the present invention, both the variable magnification operation and the focusing operation of the zoom lens are carried out by the rotation of the rotational body, and further, an arbitrary zoom magnification ratio can be selected.

By still another structure of the present invention, the magnification of the view finder is not changed during the focusing operation.

Due to the present invention, as described above, a magnification ratio and focus adjustment control device for a zoom lens barrel can be provided, in which both the variable magnification operation and the focusing operation are carried out by rotation of a rotational body; an arbitrary zoom magnification ratio can be selected; and the magnification ratio of the view finder is not changed during the focusing operation.

What is claimed is:

1. A magnification and focus adjustment control device for use in a zoom lens, comprising:
   (a) a first lens unit for holding a first lens;
   (b) a second lens unit for holding a second lens;
   (c) first guiding means for guiding a movement of the first lens unit;
   (d) second guiding means having a zoom sliding groove for guiding a movement of the second lens unit;
   (e) third guiding means having linear movement regulating means for guiding the second lens unit to move straight;
   (f) a drive source;
   (g) a magnification adjusting mechanism for adjusting a magnification of the zoom lens by driving the drive source for enabling the first guiding means to guide the first lens unit while driving the drive source for enabling the second and third guiding means to guide the second lens unit so that a mutual distance between the first and second lens units, is maintained in a prescribed relation; and
   (h) a focus adjusting mechanism for adjusting a focus of the zoom lens by driving the drive source for enabling the first guiding means to guide the first lens unit while driving the drive source for enabling the second or third guiding means to release the second lens unit from guidance thereof so that the mutual distance between the first and second lens units is changed.

2. The device of claim 1, wherein the focus adjusting mechanism drives the drive source for enabling the third guiding means to release the second lens unit from guidance thereof, and for enabling the second guiding means only to guide the second lens unit to be positioned.

3. The device of claim 1, wherein the focus adjusting mechanism drives the drive source for enabling the second guiding means to release the second lens unit from guidance thereof, and for enabling the third guiding means only to guide the second lens unit to be positioned.

4. The device of claim 1 further comprising a zoom lens barrel having the first and second guiding means provided on an inner barrel surface thereof,
   wherein the third guiding means is provided on the first lens unit,
   and wherein the magnification adjusting mechanism adjusts the magnification and the focus adjusting mechanism adjusts the focus by driving the drive source to apply a driving force thereof to the zoom lens barrel.

5. The device of claim 4, wherein the magnification adjusting mechanism adjusts the magnification by driving the drive source to transmit the driving force in a first direction, and the focus adjusting mechanism adjusts the focus by driving the drive source to transmit the driving force in a second direction opposite the first direction.

6. The device of claim 5, wherein the focus adjusting mechanism drives the drive source to transmit the driving force in the second direction, thereby the third guiding means releases the second lens unit from the guidance thereof.

7. The device of claim 6 further comprising fixing means for fixing the second lens unit to the zoom sliding groove provided on the second guiding means.

8. The device of claim 7, wherein the fixing means fixes the second lens unit to the zoom sliding groove only when the third guiding means releases the second lens unit from the guidance thereof.

9. A magnification and focus adjustment control device for use in a zoom lens, comprising:
   (a) a first lens unit for holding a first lens;
   (b) a second lens unit for holding a second lens;
   (c) first guiding means for guiding a movement of the first lens unit;
   (d) second guiding means having a zoom sliding groove for guiding a movement of the second lens unit;
   (e) third guiding means having linear movement regulating means for guiding the second lens unit to move straight;
   (f) a drive source;
   (g) a magnification adjusting mechanism for adjusting a magnification of the zoom lens by driving the drive source for enabling the first guiding means to guide the first lens unit while driving the drive source for enabling the second and third guiding means to guide the second lens unit so that a mutual distance between the first and second lens units, is maintained in a prescribed relation; and
   (h) a focus adjusting mechanism for adjusting a focus of the zoom lens by driving the drive source for enabling the first guiding means to guide the first lens unit while driving the drive source to change a relative positional relation between the first and second guiding means so that the mutual distance between the first and second lens units is changed.

10. The device of claim 9, wherein the magnification adjusting mechanism maintains a relative positional relation between the first and second guiding means in an optical axis direction of the zoom lens to be constant during a magnification adjustment, the focus adjusting mechanism changes the relative positional relation between the first and second guiding means in the optical axis direction of the zoom lens during a focus adjustment.

11. The device of claim 10, wherein the second guiding means has a second cylindrical member on which the zoom sliding groove is provided, and the first guiding means has a first cylindrical member concentrically provided with the second cylindrical member.

12. The device of claim 11, wherein the focus adjusting mechanism has a sliding groove through which the relative positional relation between the first and second cylindrical members in the optical axis direction is changed.

13. The device of claim 12 further comprising a clutch mechanism capable of selectively transmitting the drive force from the drive source to the focus adjusting mechanism.

* * * * *